US006542328B2

United States Patent
Harrison et al.

(10) Patent No.: US 6,542,328 B2
(45) Date of Patent: Apr. 1, 2003

(54) DISC SEPARATOR PLATE WITH AIR DAM

(75) Inventors: Chad R. Harrison, Oklahoma City, OK (US); Eldon L. Nelson, Oklahoma City, OK (US); David S. Allsup, Oklahoma City, OK (US); Jackson W. Nichols, Edmond, OK (US); Mohammad N. Ahmad, Oklahoma City, OK (US); Richard G. Krum, Morgan Hill, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/000,685

(22) Filed: Oct. 31, 2001

(65) Prior Publication Data

US 2002/0135933 A1 Sep. 26, 2002

Related U.S. Application Data

(60) Provisional application No. 60/277,761, filed on Mar. 21, 2001.

(51) Int. Cl.$^7$ ............................................. G11B 17/02
(52) U.S. Cl. ................................. 360/97.03; 360/97.02
(58) Field of Search ........................... 360/97.03, 97.02, 360/97.04

(56) References Cited

U.S. PATENT DOCUMENTS

| 4,237,503 | A |  | 12/1980 | Ragle |
| 4,419,704 | A |  | 12/1983 | Radman et al. |
| 4,823,215 | A |  | 4/1989 | DeMoss et al. |
| 5,036,416 | A |  | 7/1991 | Mastache |
| 5,189,574 | A |  | 2/1993 | Imamura et al. |
| 5,631,787 | A |  | 5/1997 | Huang et al. |
| 5,663,851 | A |  | 9/1997 | Jeong et al. |
| 6,064,547 | A |  | 5/2000 | Wittig et al. |
| 6,097,568 | A |  | 8/2000 | Ekhoff |
| 6,208,484 | B1 |  | 3/2001 | Voights |
| 6,266,208 | B1 |  | 7/2001 | Voights |
| 6,449,119 | B1 | * | 9/2002 | Hashizume et al. ...... 360/97.03 |
| 6,496,327 | B2 | * | 12/2002 | Xia et al. ................. 360/97.03 |

* cited by examiner

Primary Examiner—Robert S. Tupper
(74) Attorney, Agent, or Firm—Fellers, Snider, et al.

(57) ABSTRACT

A stationary disc separator plate for use in a disc drive to suppress turbulence near a disc drive read/write head used to read data from and write data to a rotatable disc. The stationary plate is supported adjacent the disc and has substantially circular inner and outer circumferences. A leading edge and a trailing edge of the plate define an open portion to accommodate radial movement of the head adjacent the disc. A trailing edge air dam disposed at the trailing edge of the plate diverts a substantial portion of an airflow generated by rotation of the disc away from the open portion to reduce an airflow velocity at the head. In disc drives having multiple discs, a plate is preferably disposed between each pair of adjacent discs. Air vents preferably extend through the thickness of the plate to reduce aerodynamic drag and hence power consumption by the drive.

20 Claims, 6 Drawing Sheets

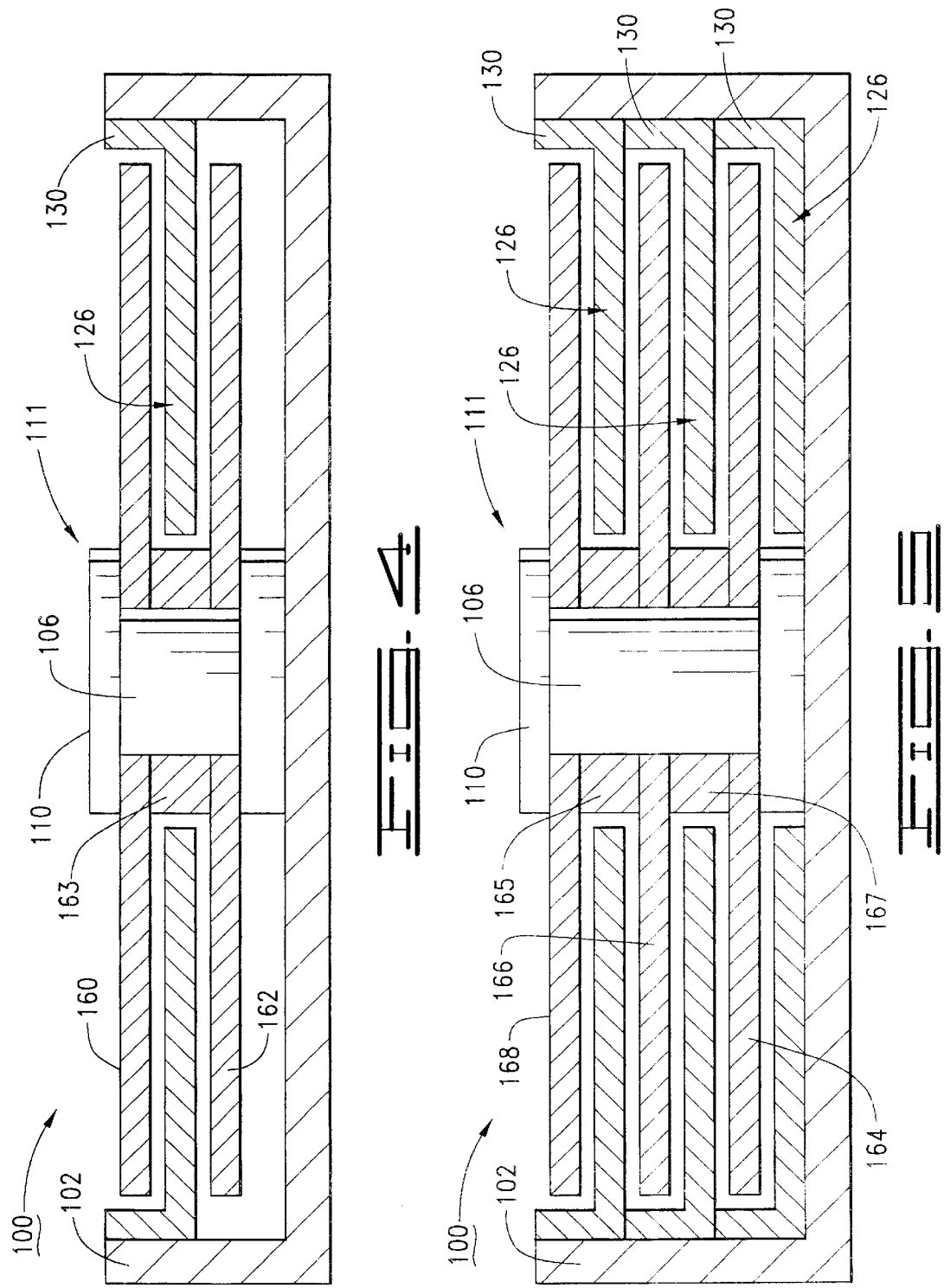

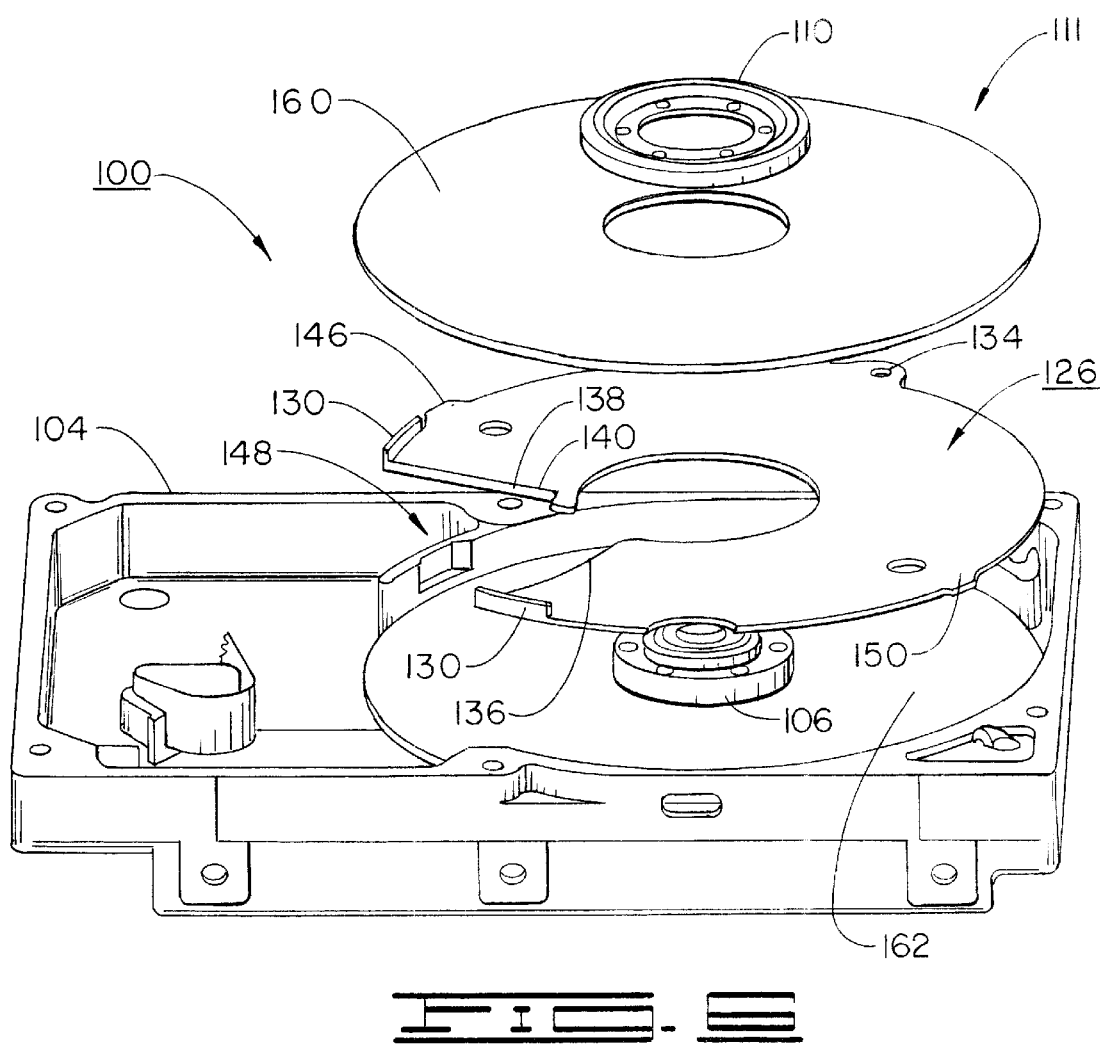
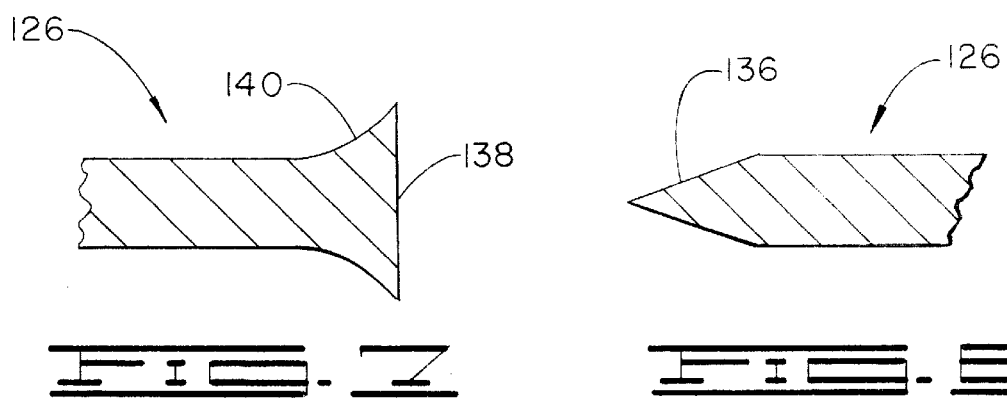

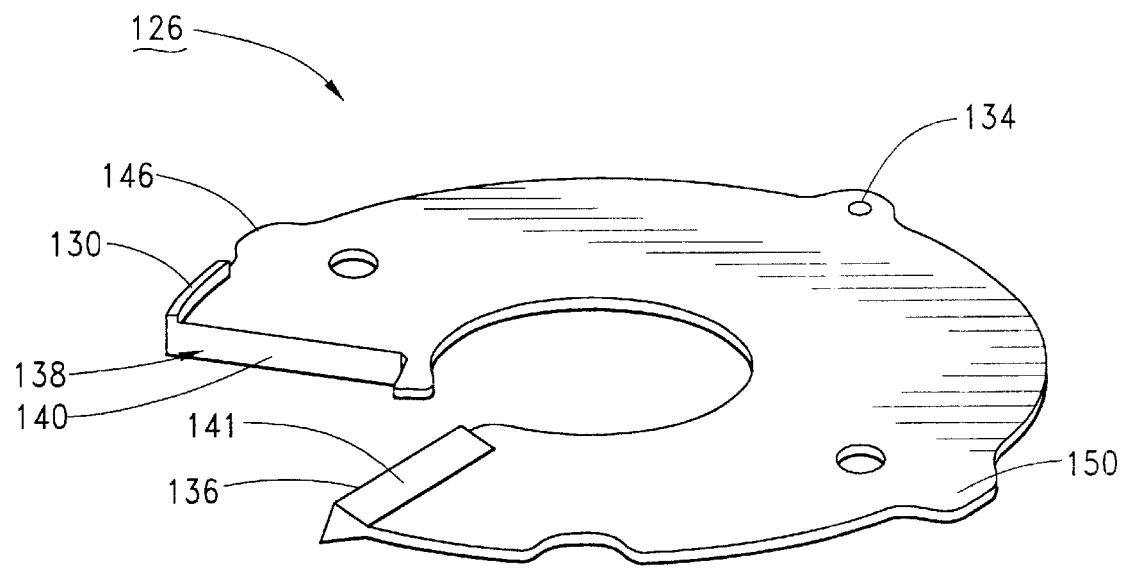
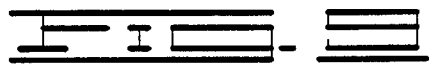
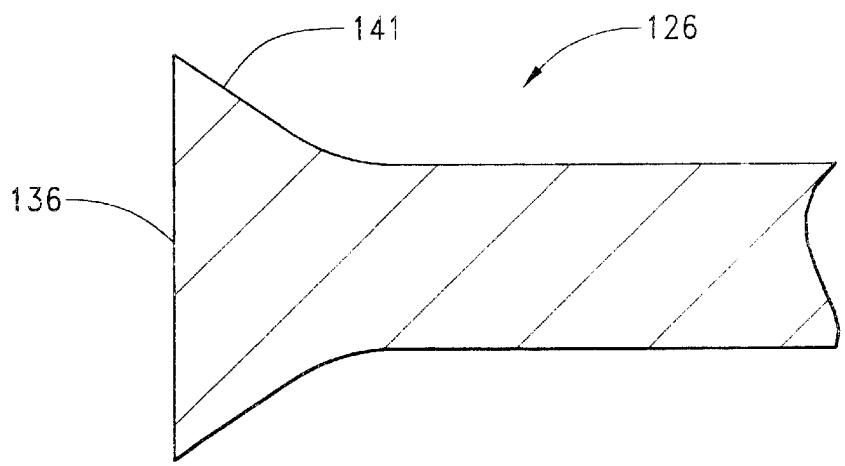
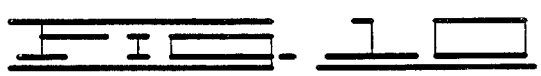

DISC SEPARATOR PLATE WITH AIR DAM

RELATED APPLICATIONS

This application claims the benefit of U.S. Provisional Application No. 60/277,761 entitled DISC SEPARATOR FOR REDUCING AIR FLOW BETWEEN SPINNING DISCS, filed Mar. 21, 2001.

FIELD OF THE INVENTION

The present invention relates generally to the field of disc drive data storage devices, and more particularly but not by way of limitation, to the placement of a disc separator having an air dam adjacent a rotatable, rigid disc of a disc drive to reduce and direct air flow generated by rotation of the disc to improve operational performance of the drive.

BACKGROUND

Modern disc drives are commonly used in a multitude of computer environments to store large amounts of data in a form that is readily available to an end user. A typical disc drive has one or more rigid magnetic recording discs that are rotated by a spindle motor at a constant high speed.

Each disc has a data storage surface divided into a series of generally concentric data tracks radially spaced across a band having an inner diameter and an outer diameter. Data are stored within the data tracks on the disc surfaces in the form of magnetic flux transitions. The flux transitions are induced by an array of read/write heads. Each data track is divided into a number of data sectors where data are stored in fixed size data blocks.

The read/write heads are supported by flexible suspension assemblies which in turn are supported by rigid actuator arms that project into the disc stack. Each head includes an air bearing surface that, in response to air currents caused by rotation of the disc, causes the head to fly adjacent to the disc surface.

A continuing trend in the industry is the simultaneous reduction in size and increase in data storage capacity and processing speed of modern disc drives. Such improvements have been brought about through a variety of changes in the configurations of the drives, including the use of higher disc rotational speeds. While advantageously reducing latency times (i.e., time spent waiting for a selected data block to reach the head as a particular disc rotates), higher rotational speeds tend to induce a greater degree of turbulence in the airflow established by the rotating discs.

Turbulence, or turbulent flow, is characterized by random fluctuations in the speed and direction of the airflow. Such turbulence can cause unwanted vibration of the discs and heads, leading to undesired head position (run-out) error during operation. Accordingly, a need exists within the art to reduce turbulence in the airflow near a disc drive head to reduce run-out errors within the drive.

SUMMARY OF THE INVENTION

In accordance with preferred embodiments, a disc drive is provided with at least one rigid, rotatable disc having a disc recording surface and a rotatable actuator assembly which supports a head adjacent the disc recording surface. A stationary disc separator plate is supported adjacent the disc and extends proximate a substantial portion of the disc recording surface. The plate includes a leading edge and a trailing edge which cooperate to form an open portion to provide clearance for the movement of the head. The leading edge is disposed downstream from the head and the trailing edge is disposed upstream from the head.

Preferably, the trailing edge of the plate includes an air dam which diverts a substantial portion of the airflow away from the head, thereby reducing turbulent flow at the head. In a preferred embodiment, the leading edge is provided with a tapered configuration, although in another preferred embodiment the leading edge is provided with a second air dam to further divert airflow away from the open portion near the head. Shroud portions which laterally extend from edges of the plate assist in the direction of the airflow along a desired path.

Preferably, the stationary plate radially extends from close proximity to a spindle motor used to rotate the disc to a disc stack assembly, upon which the discs are secured, past the outer perimeter of the discs. The stationary plate is secured to the basedeck through a tab portion of the stationary plate engaging a notched groove in the basedeck. The stationary plate preferably has sufficient stiffness such that the stationary plate is only supported at the outermost diameter. In drives having multiple discs, a stationary plate is preferably disposed between each adjacent pair of the discs. Additional stationary plates can be provided above the topmost disc and/or below the bottommost disc, as desired.

In still other preferred embodiments, the stationary plate has airflow vents defined in the plate. The number and size of the vents are selected to reduce aerodynamic drag and thereby reduce power consumption requirements of the spindle motor.

These and various other features and advantages which characterize the claimed invention will be apparent upon reading the following detailed description and upon review of the associated drawings.

BRIEF DESCRIPTION OF THE DRAWINGS

FIG. 4 is an elevational, cross-sectional view of the disc drive in accordance with a preferred embodiment in which a single stationary plate is disposed between first and second rotatable discs.

FIG. 5 is an elevational, cross-sectional view of the disc drive in accordance with another preferred embodiment in which three stationary plates are disposed adjacent three rotatable discs.

FIG. 6 is an exploded isometric view of the disc drive generally illustrating the disc drive shown in FIG. 4.

FIG. 7 is a cross-sectional view of an air dam disposed at the trailing edge of the stationary plate in FIG. 6.

FIG. 8 is a cross-sectional view of a tapered edge disposed at the leading edge of the stationary plate in FIG. 6.

FIG. 9 is an isometric view of the stationary plate in accordance with another preferred embodiment having a second air dam disposed at the leading edge of the stationary plate.

FIG. 10 is a cross-sectional view of the air dam disposed at the leading edge of the stationary plate of FIG. 9.

DETAILED DESCRIPTION

Figure 1:
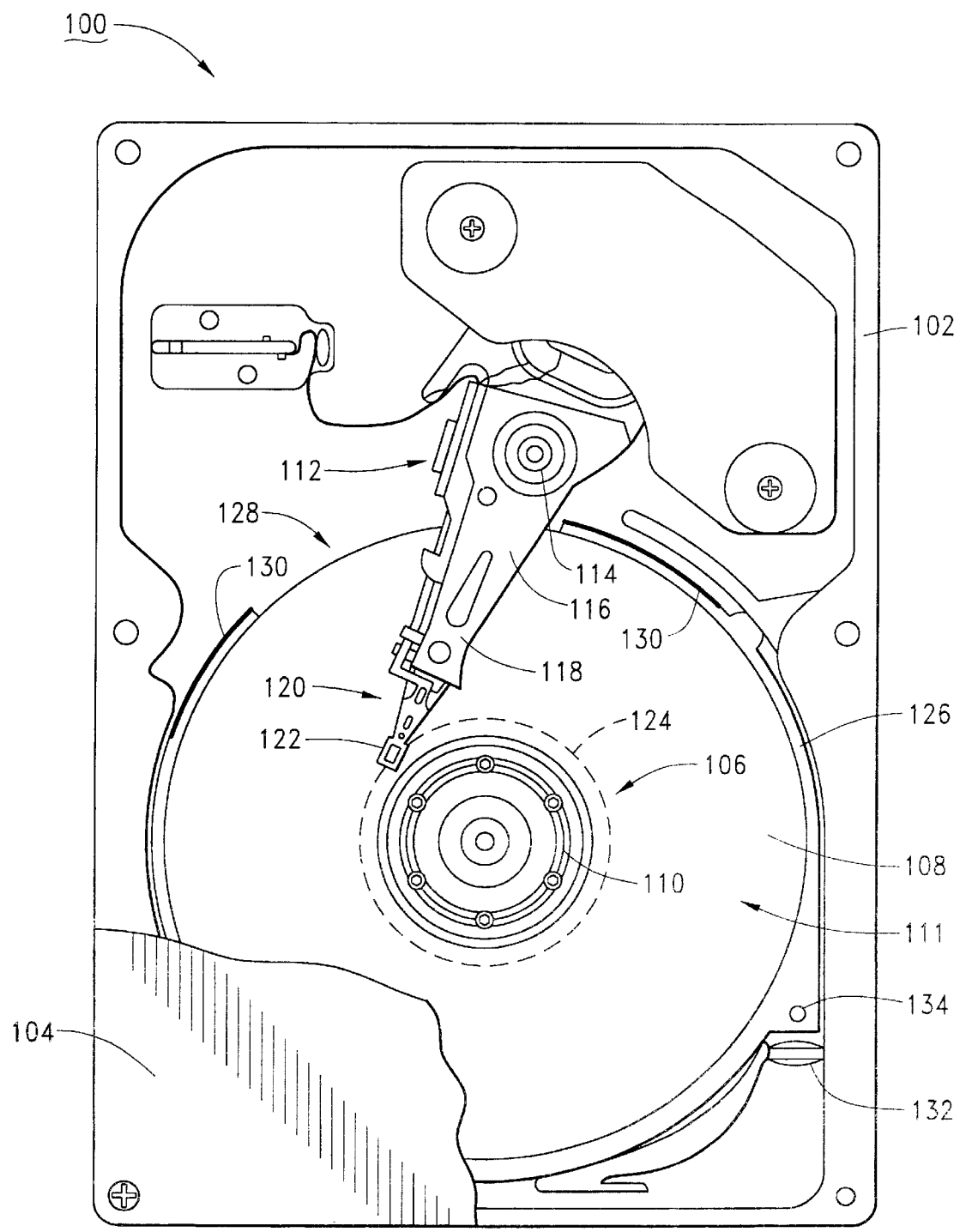
FIG. 1 is a plan view of a disc drive having a stationary disc separator plate constructed in accordance with preferred embodiments of the present invention.

Referring to the drawings in general, and more particularly to FIG. 1, shown therein is a plan view of a disc drive 100 constructed in accordance with preferred embodiments of the present invention.

The disc drive 100 includes a base deck 102 to which various disc drive components are mounted, and a cover 104 (shown in partial cutaway) which cooperates with the base deck 102 provide a sealed environment for the drive 100. It will be understood that numerous details of construction of the disc drive 100 are not included in the following description because they are believed well known to those skilled in the art and are believe to be unnecessary for the purpose of describing the present invention.

Mounted to the base deck 102 is a spindle motor 106 which rotates a number of discs 108 at a constant operational speed. The discs 108 are mounted and secured to the spindle motor 106 by a clamp ring 110. The spindle motor 106, the discs 108, intermediate spacers (not shown), and the clamp ring 110 together form a disc stack assembly 111.

Adjacent the discs 108 is an actuator assembly 112 which pivots about a pivot bearing assembly 114 in a plane parallel to the discs 108. The actuator assembly 112 includes an actuator body 116 that is supported by the pivot bearing assembly 114. The actuator body 116 has actuator arms 118 that support load arm assemblies 120. The load arm assemblies 120, in turn, support read/write heads 122 adjacent the recording surfaces of the discs 108 to write data to and read data from the discs 108. Each head 122 includes a slider assembly which aerodynamically supports the read/write head 122 in response to air currents generated by the spinning discs 108 during operation of the disc drive 100.

Each of the discs 108 has a data storage location with a data recording surface divided into concentric circular data tracks (not shown), and the read/write heads 120 are positionably located adjacent data tracks to read data from or write data to the tracks. The data recording surface is bounded at an inner extent by a circular landing zone 124 where the read/write heads 120 can come to rest against the discs 108 at times when the disc drive is not operating. It is advantageous to limit the pivotal motion of the actuator 116 so as to constrain the radial position of the read/write heads 120 to locations within the data recording surface 122.

Disposed underneath the topmost disc 108 and thus only partially visible in FIG. 1 is a stationary disc separator plate 126. The plate 126 circumferentially extends out past the outermost diameter of the discs 108 and has an open portion 128 which allows access for the actuator assembly 112 to position the heads 122 adjacent the recording surfaces of the discs 108. The stationary plate 126 includes shroud portions 130 which laterally extend from the stationary plate 126.

Secured within the basedeck 102 is a desiccant filter 132 disposed outside the outer circumference of the plate 126. Also visible in FIG. 1 is a locking feature 134 disposed within the plate 126 for securing the plate to the basedeck 102. The locking feature 134 preferably comprises a vertically aligned pin which extends through an aperture in the plate 126.

Figure 2:
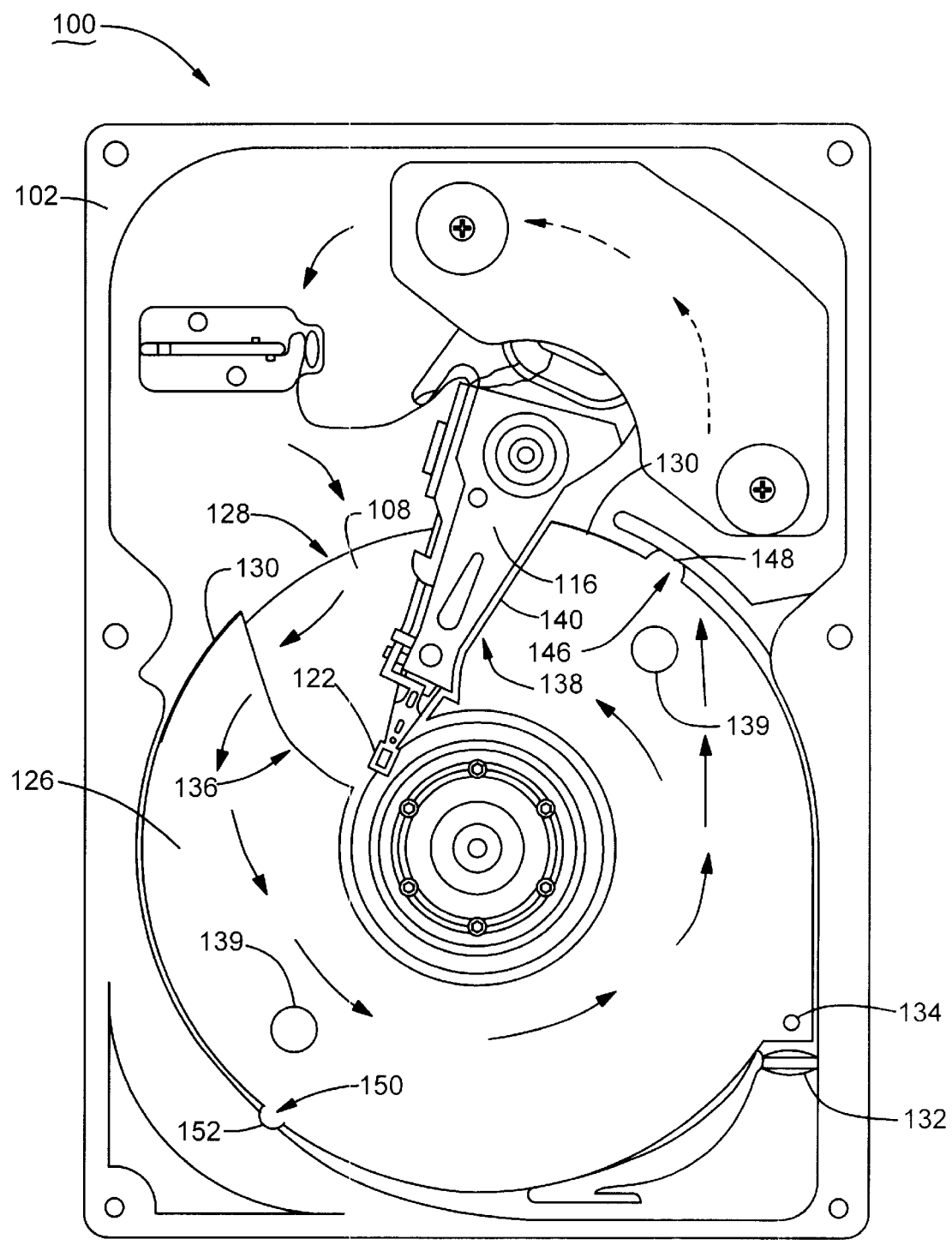
FIG. 2 is a plan view of the disc drive of FIG. 1 with the top disc removed to show the stationary plate in accordance with a preferred embodiment.

Referring now to FIG. 2, shown therein is the disc drive of FIG. 1 with the top disc 108 removed to show the stationary plate 126 in greater detail. The open portion 128 of the stationary plate 126 is defined by a leading edge 136 positioned downstream of the heads 122, and a trailing edge 138 positioned upstream of the heads. In a preferred embodiment, the leading edge 136 has a contoured shape matching the contours of the upstream side of the actuator 116 so that the actuator assembly may be disposed in close relationship to the leading edge 136. Circular apertures 139 are used to facilitate automated assembly of the disc drive 100.

The trailing edge 138 is also preferably contoured in an arcuate shape for allowing the heads 122 to be properly positioned over the disc 108. The open portion 128 of the plate 126 provides a minimum amount of exposed surface area between the discs 108 in the region near the head 122.

The trailing edge 138 of the plate 126 is shown to include an air dam 140 comprising a flared portion that restricts the passage of air into the open portion 128. The air dam 140 is configured to deflect a substantial portion of the airflow around the actuator assembly 112, as indicated by the arrows shown in FIG. 2. The air dam 140 further operates to remove turbulence in the remaining portion of the airflow that passes over the air dam 140 and reaches the head 122.

The Reynolds number is an important parameter in determining whether a flow is laminar or turbulent. For airflow, the Reynolds number Re is defined by the following relationship:

$$Re = VD/v, \quad (1)$$

where
V=velocity of the airflow,
D=a characteristic length or diameter of the particular flow field, and
v=kinematic viscosity of air.

There is a critical value $Re_c$ of the Reynolds number below which the flow is laminar and above which the flow is turbulent. Flow where the Reynolds number is about equal to $Re_c$ is called transition flow.

The Reynolds number represents a ratio of inertia forces to viscous forces acting in a flow field. Thus, for airflow near the rotating discs, the Reynolds number will be low and the flow will be laminar in a thin region near the disc called the boundary layer. The Reynolds number will increase and the flow becomes turbulent as one moves away from the disc or as the flow velocity increases. Thus, the separator plate provides a stationary surface that slows the air velocity near the stationary plate and the disc because of the viscous forces (shear forces) in the airflow.

In past generations of disc drives, the speeds of rotation of the discs were about 3,000 to 5,000 revolutions per minutes (rpm). For recent generations of disc drives, the speed of rotation of the discs 108 has increased to about 10,000 or even 15,000 rpm. If one wishes to maintain a laminar airflow in certain regions with increased speeds of rotation, one generally has to either space the discs closer together (which reduces the value of D in EQ. 1) or reduce the flow velocity in those regions. The claimed invention generally follows the latter approach and operates to reduce the flow velocity in the region near the heads 122 and the actuator arms 118. Thus, the airflow into the open portion 128 will be substantially smaller in volume and velocity than the amount of airflow deflected around the actuator assembly 112.

FIG. 2 also shows the relationship of the stationary plate 126 with the disc stack assembly 111. While the outermost diameter of the stationary plate 126 engages the basedeck 102, the innermost diameter encircles, but does not contact, the spindle motor 106. The stationary plate 126 is preferably composed of a lightweight metal material such as stainless steel.

The disc separator 126 has tabs 146, 150 which respectively extend outward from the outer diameter into corresponding grooves 148, 152. The tabs 146, 150 restrict rotational displacement of the stationary plate 126.

Figure 3:
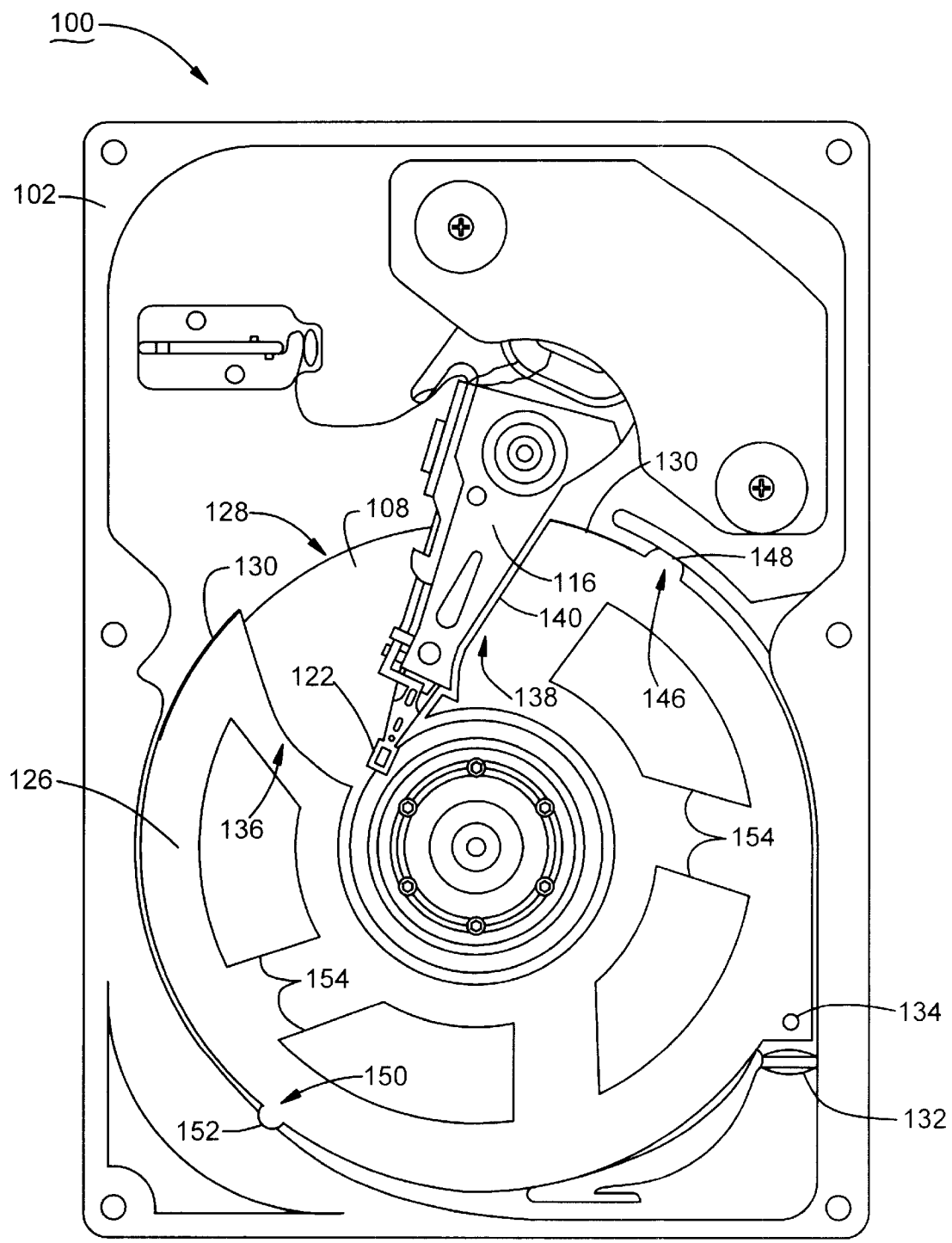
FIG. 3 is a plan view of the disc drive of FIG. 1 with the top disc removed to show the stationary plate in accordance with another preferred embodiment.

FIG. 3 illustrates a disc separator stationary plate 126 in accordance with another preferred embodiment of the present invention. Similar to FIG. 2, the top disc 108 is removed to fully expose the plate 126. Airflow vents 154 are provided in the plate 126 as shown. The airflow vents 154 are large, wedge-shaped openings selectively sized to reduce aerodynamic drag on the discs 108. Reducing the aerodynamic drag on the discs 108 reduces in turn the power required for the spindle motor to rotate the discs 108.

FIG. 4 provides a cross-sectional view of the disc drive assembly 100, showing the disc separator 126 disposed between two discs 160, 162 supported by the spindle motor 106. The discs 160, 162 are nominally identical to the discs 108 shown in FIGS. 1–3. A spacer 163 provides desired inter-disc spacing. In a preferred embodiment, the total distance between the bottom surface of the first disc 160 and the top surface of the second disc 162 is approximately 2.54 mm (0.100 inches), including the plate 126 disposed therebetween. A preferred thickness of the air gaps between the air dam 140 and the adjacent discs 160, 162 is on the order of about 0.1 mm (0.004 inches). A preferred thickness of the remaining portions of the plate is about 1.22 mm (0.048 inches), thereby leaving an air gap spacing of about 0.66 mm (0.026 inches) between the plate 126 and the adjacent discs 160, 162. Another preferred thickness of the remaining portions of the plate 126 is about 0.86 mm (0.034 inches), providing air gap spacings of about 0.84 mm (0.033 inches) between the plate 126 and the discs 160, 162. It will be noted that as the thickness of the plate increases, the power consumption requirements to rotate the spindle motor 106 also increase, due to the added resistance of the air flow with respect to the plate 126. However, it was found that a plate thickness of about 1.22 mm (0.048 inches) resulted in a significant decrease in the number of run-out errors as compared to a drive without a stationary plate.

While FIG. 4 shows the use of a single plate 126 between a pair of discs, additional plates can be readily used in various drive configurations. For disc drives having more than two discs, additional plates 126 can be added between additional pairs of discs. Plates 126 can further be added above and/or below a single disc or above and/or below the topmost and bottommost discs in a multi-disc disc stack, as desired.

FIG. 5 illustrates a side-view of a disc drive having three discs 164, 166, and 168 (and spacers 165, 167) in the disc stack assembly 111. Disposed between the bottom disc 164 and the middle disc 166 is a first disc separator plate 126, and disposed between the middle disc 166 and a top disc 168 is a second separator plate 126. A third plate 126 is disposed below the bottom disc 164.

The first separator plate 126 rests upon a groove (not shown) within the basedeck 102, similar to the placement of the disc separator 128 in a dual disc drive. The second plate 126 rests upon the first plate 126, more specifically upon the shrouding 130 of the second plate 126. The tab portion of the first plate 126 also is disposed within the basedeck groove to restrict any rotational displacement by the first plate 170.

Once the other components have been properly installed, the top cover (not shown) is secured to the basedeck 102. The top cover pressingly engages the second plate 126, exerting a compressive force through the plate shroud 130 of the plate 126 into the plate shroud 130 of the first plate 126. Once the top cover is installed, not only the compressive force of the top cover, but also the placement of the tab portions within the basedeck groove secures the plates properly in position. Thus, the spatial relationship of the plates with respect to the discs is maintained and the alignment between the open portion 128 and the rotational path of actuator assembly 112 is insured.

FIG. 6 generally provides an exploded, perspective view of the disc drive configuration of FIG. 4. The trailing edge air dam 140 at the trailing edge 138 is shown in greater detail in FIG. 7. The leading edge 136 is provided with a tapered (chamfered) configuration to present a streamlined surface to the incoming flow, as shown in greater detail in FIG. 8.

FIGS. 9 and 10 show another embodiment for the plate 126 having an additional air dam 141 disposed at the leading edge 136. Because the air dam 141 restricts the incoming flow near the leading edge 136, the plate shroud 130 near the leading edge in FIG. 6 has been removed to allow air to flow into the area between the discs. This will tend to direct the flow away from the actuator assembly close to the leading edge 136.

For the embodiment shown in FIGS. 9 and 10, it will be noted that the disc separator plate 126 supports the leading and trailing edge air dams 141, 140 and slows the velocity through the open portion 128 through viscous forces. The airflow between the top cover and the top disc 160 (shown in FIG. 6) and the airflow between the bottom disc (162) and the base deck also have significant viscous forces. However, these viscous forces are generally not as great as the viscous forces between the stationary plate and the discs because the air spaces between the stationary plate and the discs are smaller.

Accordingly, the present invention is generally directed to a stationary plate (such as 126) with an air dam (such as 140) for directing the airflow between a first rotating disc (such as 160) and a second rotating disc (such as 162) away from a read/write head (such as 122). The stationary plate is secured to a basedeck (such as 102). The stationary plate has a substantially circular outer circumference which is positioned in flushing engagement with the basedeck. The plate has a radially extending open portion (such as 128) disposed from the outer circumference to an inner circumference of the plate for the placement of a head in a reading/writing relationship with the first disc by an actuator. Between the outer circumference and the inner circumference on the plate is an airflow vent (such as 154) for reducing the aerodynamic drag on the spinning discs. Furthermore, the plate has a circumferentially disposed plate shroud (such as 130) disposed on the outer circumference of the plate for directing the airflow around an outmost diameter of the spinning discs.

For purposes of the appended claims, it will be understood that the function of the recited "first means" is carried out by the various embodiments of the stationary plate 126 disclosed herein, including the trailing edge air dam 140.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc separator plate while maintaining substantially the same functionality without departing from the scope and spirit of the present invention. In addition, although the preferred embodiments described herein are directed to a disc separator plate for a disc drive, it will be appreciated by those skilled in the art that the teachings of the present invention can be applied to other systems without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A stationary plate configured for placement between a first rotatable rigid disc and a second rotatable rigid disc of a disc drive, the disc drive having an actuator assembly which positions a head adjacent the first disc, the stationary plate comprising:
   a substantially circular outer circumference and a substantially circular inner circumference;
   a leading edge and a trailing edge, each of which extends from the inner circumference to the outer circumference to define an open portion radially extending from the outer circumference to the inner circumference and angularly extending between the trailing edge and the leading edge to accommodate radial movement of the head by the actuator assembly; and
   a trailing edge air dam disposed at the trailing edge and having a thickness greater than a thickness of remaining portions of the stationary plate, the trailing edge air dam diverting a substantial portion of an airflow generated by rotation of the discs away from the open portion to substantially reduce an airflow velocity near the head.

2. The stationary plate of claim 1 further comprising a leading edge air dam disposed at the leading edge to further reduce the airflow velocity near the head.

3. The stationary plate of claim 1 further comprising a plate shroud circumferentially disposed at the outer circumference of the stationary plate for directing the airflow generated by the rotation of the discs.

4. The stationary plate of claim 1 wherein the leading edge tapers to a second thickness less than the thickness of the remaining portions of the stationary plate.

5. The stationary plate of claim 1 wherein the leading edge is contoured to accommodate the travel of the head as the actuator assembly pivots about a bearing assembly.

6. The stationary plate of claim 1 further comprising an airflow vent which extends through the thickness of the stationary plate to reduce aerodynamic drag of the airflow passing over the stationary plate.

7. A disc drive comprising:
   a basedeck;
   a spindle motor supported by the basedeck and having a rotatable hub;
   a first disc mounted to the hub for rotation about a central axis;
   an actuator assembly supported by the basedeck and which positions a read/write head adjacent the first disc; and
   a stationary plate supported by the basedeck adjacent and substantially parallel to the first disc, comprising:
      a substantially circular outer circumference and a substantially circular inner circumference;
      a leading edge and a trailing edge, each of which extends from the inner circumference to the outer circumference to define an open portion radially extending from the outer circumference to the inner circumference and angularly extending between the trailing edge and the leading edge to accommodate radial movement of the head by the actuator assembly; and
      a trailing edge air dam disposed at the trailing edge and having a thickness greater than a thickness of remaining portions of the stationary plate, the trailing edge air dam diverting a substantial portion of an airflow generated by rotation of the discs away from the open portion to substantially limit the airflow in the open portion of the stationary plate.

8. The disc drive of claim 7 wherein the stationary plate further comprises a leading edge air dam disposed at the leading edge to further limit the airflow in the open portion of the stationary plate.

9. The disc drive of claim 7 further comprising a second disc parallel to the first disc and mounted on the spindle motor hub for rotation about the central axis, wherein the stationary plate is disposed between the first and second discs.

10. The disc drive of claim 7 further comprising an airflow vent which extends through the thickness of the stationary plate to reduce aerodynamic drag of the airflow passing over the stationary plate.

11. The disc drive of claim 7 wherein the leading edge tapers to a second thickness less than the thickness of the remaining portions of the stationary plate.

12. The disc drive of claim 7 wherein the leading edge is contoured to accommodate the travel of the head as the actuator assembly pivots about a bearing assembly.

13. The disc drive of claim 7 wherein the stationary plate further comprises a radially extending tab which engages the basedeck to limit rotational displacement of the stationary plate relative to the basedeck.

14. A disc drive comprising:
   a basedeck;
   a spindle motor supported by the basedeck and having a rotatable hub;
   a first disc mounted to the hub for rotation about a central axis;
   an actuator assembly supported by the basedeck and which positions a read/write head adjacent the first disc; and
   first means for diverting a substantial portion of an airflow generated by rotation of the discs away from the head to provide a reduced airflow velocity at the head.

15. The disc drive of claim 14, wherein the first means comprises a stationary plate supported by the basedeck adjacent and substantially parallel to the first disc, comprising:
   a substantially circular outer circumference and a substantially circular inner circumference;
   a leading edge and a trailing edge, each of which extends from the inner circumference to the outer circumference to define an open portion radially extending from the outer circumference to the inner circumference and angularly extending between the trailing edge and the leading edge to accommodate radial movement of the head by the actuator assembly; and
   a trailing edge air dam disposed at the trailing edge and having a thickness greater than a thickness of remaining portions of the stationary plate, the trailing edge air dam diverting a substantial portion of an airflow generated by rotation of the discs away from the open portion to substantially limit the airflow in the open portion of the stationary plate.

16. The disc drive of claim 15 wherein the stationary plate further comprises a leading edge air dam disposed at the leading edge to further limit the airflow in the open portion of the stationary plate.

17. The disc drive of claim 15 further comprising a second disc parallel to the first disc and mounted on the spindle motor hub for rotation about the central axis, wherein the stationary plate is disposed between the first and second discs.

18. The disc drive of claim 15 further comprising an airflow vent which extends through the thickness of the stationary plate to reduce aerodynamic drag of the airflow passing over the stationary plate.

19. The disc drive of claim 15 wherein the leading edge tapers to a second thickness less than the thickness of the remaining portions of the stationary plate.

20. The disc drive of claim 15 wherein the leading edge is contoured to accommodate the travel of the head as the actuator assembly pivots about a bearing assembly.

* * * * *

UNITED STATES PATENT AND TRADEMARK OFFICE
CERTIFICATE OF CORRECTION

PATENT NO. : 6,542,328 B2
DATED : April 1, 2003
INVENTOR(S) : Chad R. Harrison et al.

It is certified that error appears in the above-identified patent and that said Letters Patent is hereby corrected as shown below:

<u>Title page,</u>
Item [*] Notice, replace "by 0 days." with -- by 2 days. --.

<u>Column 3,</u>
Lines 32 and 36, replace "read/write heads 120" with -- read/write heads 122 --.
Line 40, replace "120 to locations" with -- 122 to locations --.
Line 40, replace "surface 122." with -- surface. --.

Signed and Sealed this

Twelfth Day of August, 2003

JAMES E. ROGAN
*Director of the United States Patent and Trademark Office*